United States Patent [19]

Koehler et al.

[11] Patent Number: 5,305,511
[45] Date of Patent: Apr. 26, 1994

[54] HAND TOOL FOR APPLYING A MOTION STOP FERRULE TO A SAFETY CABLE

[75] Inventors: Robert H. Koehler, Secaucus; William E. Koehler, North Bergen, both of N.J.

[73] Assignee: Bergen Cable Technologies, Inc., Lodi, N.J.

[21] Appl. No.: 38,266

[22] Filed: Mar. 29, 1993

Related U.S. Application Data

[63] Continuation-in-part of Ser. No. 692,569, Apr. 29, 1991, Pat. No. 5,214,832.

[51] Int. Cl.⁵ .................................. B23P 19/04
[52] U.S. Cl. ............................. 29/268; 29/280; 29/282; 140/123.6
[58] Field of Search ............... 29/268, 255, 280, 281, 29/270, 278, 203 H, 282, 235, 237; 140/123.6

[56] References Cited

U.S. PATENT DOCUMENTS

| | | | |
|---|---|---|---|
| 465,848 | 12/1891 | Gray . | |
| 847,776 | 3/1907 | Huising . | |
| 1,147,845 | 7/1915 | Brooks . | |
| 1,182,602 | 5/1916 | Tuohy . | |
| 1,277,305 | 8/1918 | Gerrard . | |
| 1,408,846 | 3/1922 | Turner . | |
| 1,555,819 | 10/1925 | Baruch . | |
| 1,807,479 | 5/1931 | James . | |
| 2,267,532 | 12/1941 | Moberg | 81/91 |
| 2,764,861 | 10/1956 | Wenk, Jr. | 53/135 |
| 3,157,075 | 11/1964 | Filia | 81/313 |
| 3,353,227 | 11/1967 | Kabel | 24/16 |
| 3,498,340 | 3/1970 | Epstein | 140/113 |
| 3,570,554 | 3/1971 | Kabel | 140/93.2 |
| 3,639,977 | 2/1972 | Over | 29/628 |
| 3,658,296 | 4/1972 | Yegge | 29/252 |
| 3,710,610 | 1/1973 | McCaughey | 29/203 H |
| 3,911,970 | 10/1975 | Lundberg et al. | 140/93.4 |
| 4,170,820 | 10/1979 | Klose | 29/789 |
| 4,747,433 | 5/1988 | Dixon | 140/150 |
| 4,966,600 | 10/1990 | Songer et al. | 606/74 |
| 5,052,094 | 10/1991 | Plasse et al. | 29/252 |
| 5,116,178 | 5/1992 | Lerman et al. | 411/87 |
| 5,116,340 | 5/1992 | Songer et al. | 29/252 |
| 5,127,144 | 7/1992 | Plasse et al. | 29/252 |
| 5,152,043 | 10/1992 | Plasse et al | 29/252 |
| 5,167,059 | 12/1992 | Plasse et al. | 29/433 |
| 5,199,146 | 4/1993 | Grover et al. | 29/268 |
| 5,214,832 | 6/1993 | Koehler et al. | 29/268 |
| 5,230,129 | 7/1993 | Scruggs | 29/267 |

FOREIGN PATENT DOCUMENTS 2185706A 7/1987 United Kingdom .

Primary Examiner—Bruce M. Kisliuk
Assistant Examiner—E. Morgen
Attorney, Agent, or Firm—Bacon & Thomas

[57] ABSTRACT

A hand tool for applying a ferrule to a safety cable is disclosed having a ferrule positioning device to position the ferrule while a safety cable is placed through the ferrule and through the tool, a mechanism for applying a tension to the cable and a mechanism to crimp the ferrule so as to attach the ferrule to the safety cable. A ferrule holding device, which may contain several ferrules is removably attachable to an elongated body of the hand tool such that one of the ferrules in the holding device is aligned with an opening defined by the elongated body. After threading the safety cable through the ferrule in the ferrule holding device and the opening in the elongated body, it is attached to a tensioning device which applies a predetermined tension to the safety cable. The tensioning device incorporates a clutch which disengages the tensioning device once the predetermined tension has been achieved. A pair of handles are pivotally attached to each other and are associated with the elongated body and a crimping punch such that when the handles are squeezed toward each other, the crimping punch deforms the ferrule to attach it to the safety cable. The hand tool according to this invention incorporates a locking device to prevent the handles from being moved toward each other until the predetermined tension has been placed in the safety cable.

16 Claims, 10 Drawing Sheets

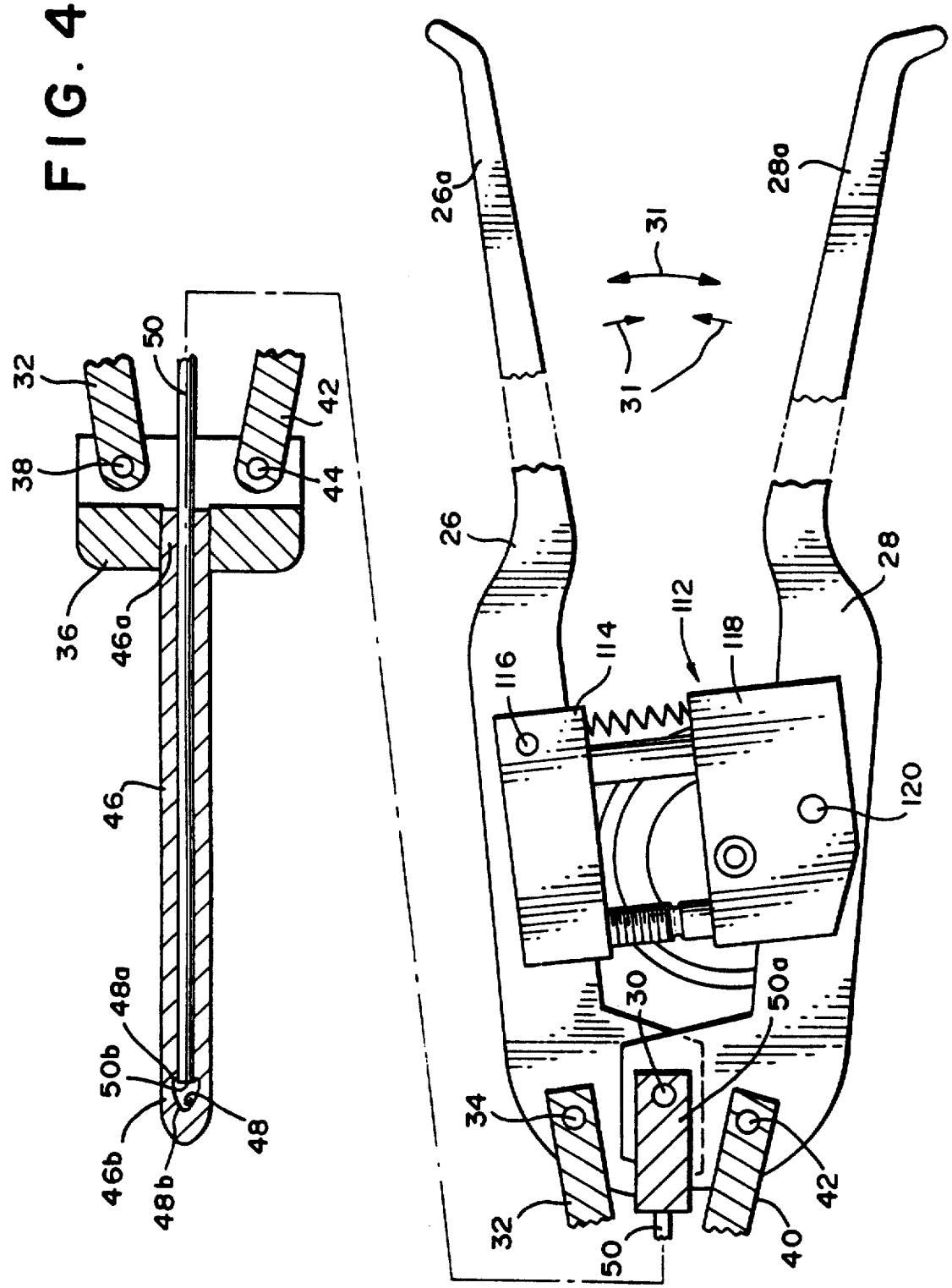

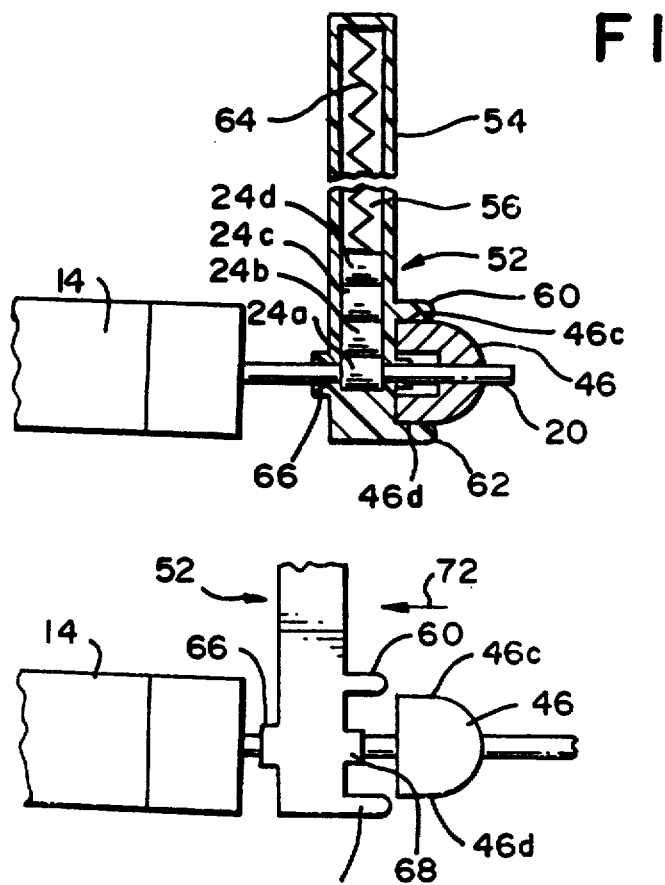
FIG. 5A
FIG. 5B
FIG. 5C
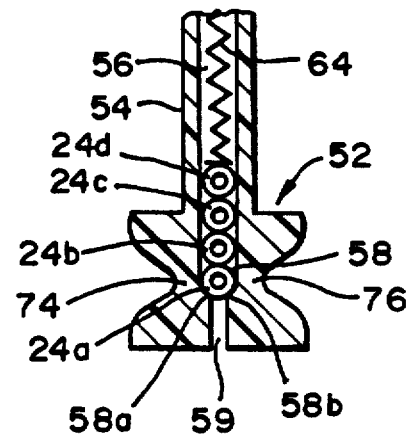
FIG. 6A
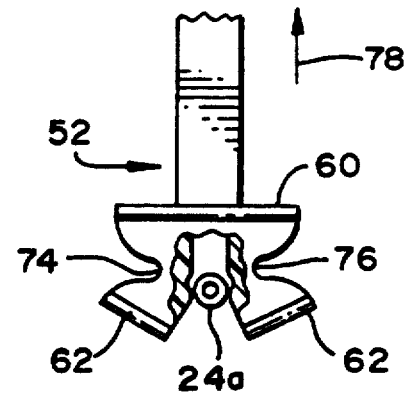
FIG. 6B

HAND TOOL FOR APPLYING A MOTION STOP FERRULE TO A SAFETY CABLE

This is a continuation-in-part of U.S. patent application Ser. No. 07/692,569 filed Apr. 29, 1991, now U.S. Pat. No. 5,214,832.

BACKGROUND OF THE INVENTION

The present invention relates to a hand tool for applying a ferrule to a safety cable passing through a plurality of threaded fasteners to prevent the unintentional unthreading of such fasteners.

In rotary machinery having close tolerances between rotating and stationary elements, such as turbines, it is imperative that all objects, no matter how small, be kept from contact with the rotating elements of the machinery. The presence of any foreign object could result in the catastrophic failure of the entire machine.

Such machinery is inherently complex and requires many nuts, bolts, screws and other threaded fasteners to assemble all of its components. Since the operation of such machinery may involve very high rotating speeds, which may induce vibrations into the machine elements, it is necessary to provide some means for preventing the inadvertent unthreading of the numerous threaded fasteners.

It is known to apply lock wires to threaded fasteners to prevent their inadvertent unthreading. Typically, the lock wire passes through a transverse hole in at least two threaded fasteners and is twisted back on itself in alternating clockwise and counterclockwise directions between the threaded fasteners. The process is duplicated between additional threaded fasteners until the entire threaded fastener pattern has been safety wired. Following the required stringing and twisting, the wire is cut and bent into a certain position.

While the known lock wire technique has provided satisfactory results, it requires a very time consuming and laborious application process. Often the final result is unsatisfactory due to variations in the quantity and tautness of the twists, and the variations in the tension on the lock wire. It has been estimated that annual losses of approximately 10,000,000 are incurred just from reworking unacceptable lock wire assemblies.

SUMMARY OF THE INVENTION

This invention relates to a hand tool for applying a ferrule to a safety cable type of lock will having a ferrule positioning device to position the ferrule while a safety cable is inserted through the ferrule and through the tool, a mechanism for applying a tension to the cable and a mechanism to crimp the ferrule so as to attach the ferrule to the safety cable. A ferrule holding device, which may contain several ferrules, is removably attachable to an elongated body of the hand tool such that one of the ferrules in the holding device is aligned with an opening defined by the elongated body.

After threading the safety cable through the ferrule in the ferrule holding device and the opening in the elongated body, it is attached to a tensioning device which applies a predetermined tension to the safety cable. The tensioning device incorporates a clutch which disengages the tensioning device once the predetermined tension has been achieved.

A pair of handles are pivotally attached to each other and are associated with the elongated body and a crimping punch such that when the handles are squeezed toward each other, the crimping punch deforms the ferrule to attach it to the safety cable. The hand tool according to this invention may incorporate a locking device to prevent the handles from being moved toward each other until the predetermined tension has been placed in the safety cable. The clutch mechanism which disengages the tensioning device may also disengage the locking mechanism to enable the handles to be moved toward each other once the predetermined tension has been achieved.

The invention also incorporates a ratchet device associated with the handles to prevent the handles from returning to their initial, spaced apart positions until the ferrule has been properly crimped onto the safety cable. This positively ensures that the ferrule is properly affixed to the safety cable by preventing the return of the handles to their initial positions and the removal of the device from the ferrule.

BRIEF DESCRIPTION OF THE DRAWINGS

FIG. 4 is a longitudinal cross-sectional view taken along line IV—IV in FIG. 3.

FIGS. 5A-5C are schematic illustrations of the use of a ferrule holding member to position the ferrule while threading the safety cable through the ferrule and the hand tool.

FIGS. 6A and 6B are side views of the ferrule holding member illustrating the storage and withdrawal of a ferrule from the ferrule holding device.

DETAILED DESCRIPTION OF THE PREFERRED EMBODIMENT

Figure 1:
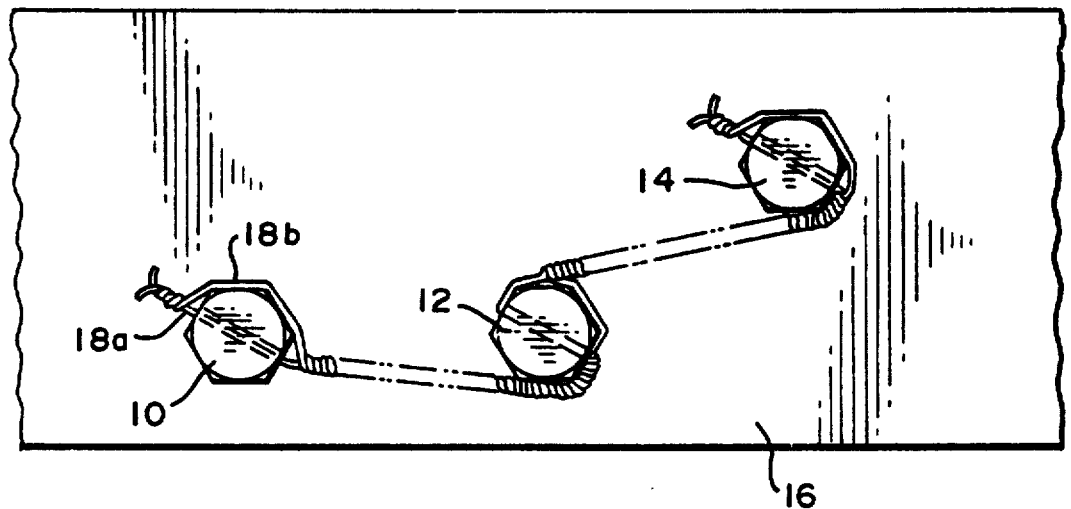
FIG. 1 is a plan view of a safety cable applied according to the known techniques.

A lock wire 18 applied in accordance with the prior art is illustrated in FIG. 1 wherein threaded fasteners 10, 12 and 14 are engaged with a portion 16 of a rotating apparatus (not otherwise shown). The lock wire 18 comprises two wire strands 18a and 18b twisted together at one end are separated such that strand 18a passes through a transverse opening in fastener 10 while strand 18b passes around the exterior of the fastener 10. The strands are twisted together on the opposite side of fastener 10 and, again, one strand passes through a transverse opening formed in fastener 12 while the other strand passes around fastener 12. The lock wire 18 continues until the last fastener, in this particular instance fastener 14, whereupon one strand passes through a transverse opening in the fastener, while the other strand passes around the exterior of the fastener. The strands are twisted together on the opposite side of the fastener 14.

Figure 2:
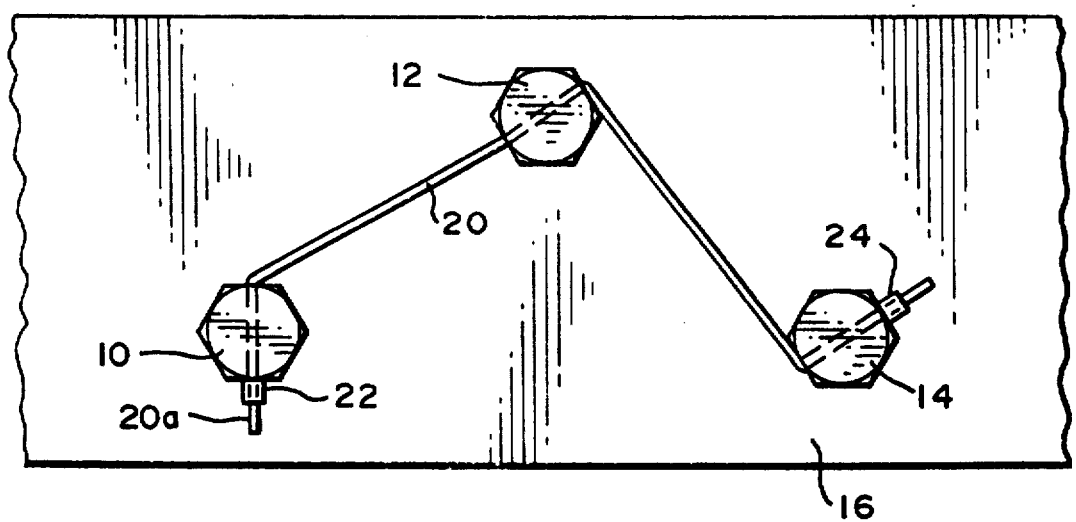
FIG. 2 is a plan view of a safety cable applied using the apparatus according to the present invention.

FIG. 2 illustrates a safety cable system applied using the apparatus according to the present invention. Threaded fasteners 10, 12 and 14 are once again engaged with the machinery portion 16. Safety cable 20 comprises a multi strand cable having a motion stop ferrule 22 affixed to end 20a. Safety cable 20 passes through transverse openings formed in the threaded fasteners 10, 12 and 14 until ferrule 22 bears against one side of fastener 10. At this point, ferrule 24 is inserted over the end of cable 20 against the side of fastener 14, a tension is applied to the safety cable 20 and the ferrule 24 is crimped onto the safety cable such that it bears against a side of the fastener 14 thereby securing the cable to the series of fasteners through which it is threaded. Safety cable 20 is then automatically trimmed. The pre-determined is tension is maintained in safety cable 20 by the contact of ferrules 22 and 24 with the sides of the threaded fasteners 10 and 14, respectively.

Figure 3:
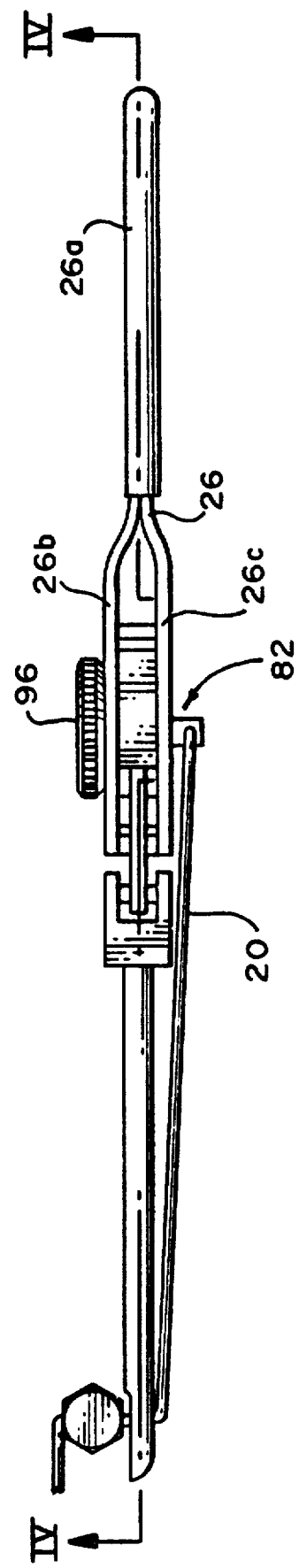
FIG. 3 is a top plan view of the hand tool according to the present invention.

As best illustrated in FIGS. 3 and 4, the hand crimping tool according to the present invention comprises a pair of handle members 26 and 28 pivotally attached together via pivot pin 30 so as to pivot about the longitudinal axis of the pivot pin 30 toward and away from each other as illustrated by arrows 31. The handle members 26 and 28 may have cushioned or coated hand gripping areas 26a and 28a, respectively, and may have bifurcated front portions with generally parallel extending portions illustrated at 26b and 26c in FIG. 3. It is to be understood that handle 28 may have a similar bifurcated construction, but with the bifurcated members located closer together such that the front portions of handle 28a may fit between portions 26b and 26c near the pivot pin 30.

Link member 32 has a first end pivotally attached to handle member 26 by a pivot pin 34, whose axis may extend generally parallel to the axis of pivot pin 30. The opposite end of link member 32 is pivotally attached to a fixed body member 36 by a pivot pin 38.

In similar fashion, link member 40 has a first end attached to handle member 28 via pivot pin 42 and a second end pivotally attached to body member 36 by pivot pin 44. Again, the axis of pivot pin 42 may extend parallel to that of pivot pin 30.

An elongated nose portion 46 of body 36 has a proximal end portion 46a fixedly attached to body member 36, such as by brazing or the like. Elongated nose portion 46 also has a distal end portion 46b which includes a ferrule receiving opening 48, at least a portion of which has a generally triangular elongate configuration as illustrated in FIG. 4, the opening including a proximal end 48a adjacent punch driving member 50 and an opposed distal end 48b. Elongated nose portion 46 has a longitudinally extending, central opening which slidably accommodates crimping punch driving member 50. Driving member 50 has an end 50a attached to the handle members 26 and 28 by pivot pin 30. As will be hereinafter explained in more detail, the driving member 50 is movable between a retracted position at which a crimping punch distal end 50b does not extend significantly into opening 48 and a full position at which punch 50b extends into the opening 48 through a proximal sidewall thereof so as to bear against a ferrule in the opening 48 so as to crimp the ferrule onto a safety cable extending through the ferrule. As will be described below, a cable receiving aperture 70 extends into the bottom of opening 48.

In order to use the hand tool according to the present invention, the safety cable must first be threaded through a ferrule as well as the aperture 70; a tension must be applied to the safety cable to a predetermined value; and the ferrule must be permanently crimped onto the safety cable.

The first portion of the operational procedure may be carried out with the assistance of a ferrule holding member illustrated generally at 52 in FIGS. 5A–5C, 6A and 6B. The ferrule holding member 52 may have a magazine portion 54 defining a storage chamber 56 adapted to accommodate a plurality of ferrules 24. In FIGS. 5A and 6A four such ferrules 24a, 24b, 24c and 24d are illustrated, but it is to be understood that any number of such ferrules may be stored in the storage chamber 56. Ferrule holding member 52 also has an insertion chamber 58 which is defined by edge portions 58a and 58b. As can be seen in FIGS. 5A and 6A, spring 64 bears against a portion of the magazine 54 and the uppermost ferrule in the magazine (in this instance ferrule 24d) so as to urge the stack of ferrules from the storage chamber 56 into the insertion chamber 58.

Resilient lip members 60 and 62 extend from the ferrule holding member 52 and are located so as to frictionally engage surfaces 46c and 46d formed on opposite sides of nose portion 46. When resilient lip members 60 and 62 have removably attached the ferrule holding member 52 to the nose portion 46, the insertion chamber 58 is in alignment with opening 48.

Ferrule holding member 52 may also define collar extensions 66 and 68 extending from opposite sides. Each of these extensions define an opening which is in alignment with the opening of the ferrule 24a located in the insertion chamber 58. The distal end of the opening extending through extension 66 may be beveled so as to have a generally conical shape to facilitate the threading of the end of the safety cable into and through the ferrule holding member 52.

Figure 7:
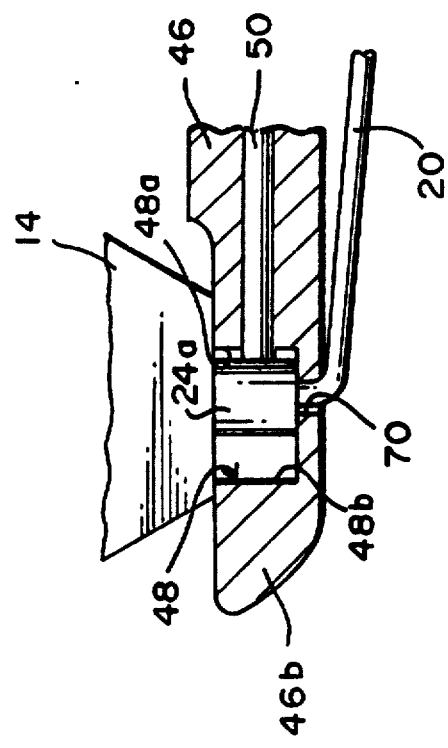
FIG. 7 is a partial, top, cross-sectional view illustrating the ferrule installed on the safety cable and inserted into the tool ready to be crimped.

As can be seen in FIG. 5A, the end of the safety cable 20 is placed through the opening in the extension 66 which automatically directs the cable through the opening in the ferrule 24a and out through the opening in the extension 68. The end of cable 20 is then inserted through 48 in the elongated body 46 as well as a smaller, generally cylindrical cable receiving aperture 70 which communicates with opening 48 at the opposite side of nose portion 46, as illustrated in FIG. 7. Cable receiving aperture 70 intersects the bottom of opening 48 closer to the proximal end 48a of ferrule receiving opening 48 than the distal end 48b of the opening as illustrated in FIG. 7 such that, when a ferrule 24a is placed in the opening 48, the central opening through the ferrule 24a will be aligned with the aperture 70 to permit threading of the cable 20 through the ferrule 24a and aperture 70. Of course, the diameter of the aperture 70 essentially corresponds with the diameter of cable 20 so that, during crimping, the free end of cable 20 extending beyond ferrule 24a will be severed from that portion of the cable extending through the ferrule 24a, all of which will be described in more detail below.

Once the desired amount of safety cable 20 has been pulled through the threaded member 14, the ferrule 24a and the nose portion 46, the ferrule holding member 52 is moved in the direction of arrow 72 in FIG. 5B so as to disengage the ferrule holding member 52 from the elongated body 46. As can be seen in FIG. 6A, ferrule holding member 52 has reduced thickness wall portions 74 and 76 located generally on opposite sides of the insertion chamber 58. These reduced thickness wall sections 74 and 76 enable the lower portion of the ferrule holding member 52 separated by slit 59 and located on either side of the insertion chamber to pivot outwardly, as illustrated in FIG. 6B, when the ferrule holding member is urged upwardly in the direction of arrow 78 as illustrated in FIG. 5C. Movement in the direction of arrow 78 allows the ferrule 24a in the insertion chamber 58, which has been threaded onto safety cable 20, to pass outwardly from the ferrule holding member 52. Once ferrule 24a has cleared the edge portions 58a and 58b, the natural resiliency of the ferrule holding member 52 returns its lower portion to the configuration illustrated in FIG. 6A to prevent other ferrules from being ejected. Spring 64 then urges the stack of ferrules downwardly such that ferrule 24b is now located in the insertion chamber.

Following the removal of the ferrule holding member 52, nose portion 46 is moved in the direction of arrow 80, as illustrated in FIG. 5C, to insert the ferrule 24a into the opening 48, as illustrated in FIG. 7.

At this point, it is necessary to apply a predetermined tension to the safety cable 20 before permanently attaching ferrule 24a to the cable by crimping. This is accomplished by attaching the end of safety cable 20 to a tensioning device, generally indicated at 82 in FIG. 3 and 8. The tensioning mechanism is illustrated in FIGS. 8-12. The tensioning mechanism according to the present invention comprises a one-way rotation mechanism 84, which may be any known, commercially available device. Tension member 86 is inserted through one-way rotation device 84 such that its headed portion 86a is located on one side of the mechanism 84, while a safety cable gripping portion 86b extends out the opposite side. End 86b may define a slot 88 having an enlarged, inner portion 88a so that the end of the safety cable 20 may be inserted into the slot 88 and displaced from alignment with the slot 88 in the enlarged portion 88a. Notch 89 may accommodate a C-clip (not shown) to retain the tension member 86 in the one-way rotation mechanism 84. Tension member 86 also defines a longitudinally extending central opening, which is internally threaded.

Face 90 of head portion 86a has mounted thereon at least one protrusion 92 extending therefrom. The protrusions 92 may be ball members rotatably affixed to the tension member, or members fixedly attached to and extending from the face 90. Although four such protrusions are shown (see FIG. 11) it is to be understood that more or less may be utilized without exceeding the scope of this invention.

Figure 9:
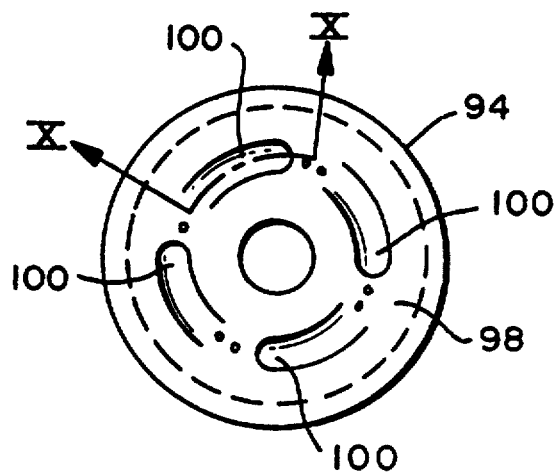
FIG. 9 is a rear view of the clutch plate viewed in the direction of arrow IX in FIG. 8.
Figure 10:
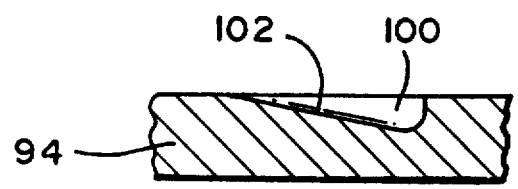
FIG. 10 is a partial, cross-sectional view taken along line X—X in FIG. 9.
Figure 11:
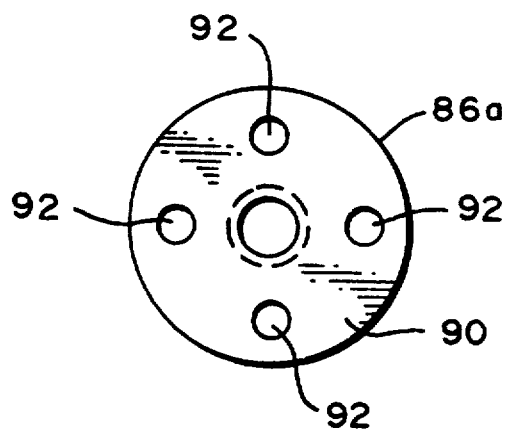
FIG. 11 is a front view of the tension member viewed in the direction of arrow XI in FIG. 8.
Figure 12:
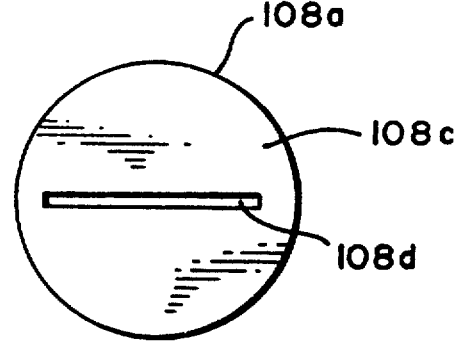
FIG. 12 is a front view of the tension adjusting screw viewed in the direction of arrow XII in FIG. 8.

Clutch plate 94 is fixedly attached to a recessed portion of winding or control knob member 96 via any known means, such as threaded fasteners, or the like. Face 98 of clutch plate 94, as illustrated in FIGS. 9 and 10, defines at least one indentation 100 having an inclined ramp surface 102. The indentations 100 are dimensioned so as to be engaged by the protuberances 92. The number of indentations is equal to the number of protuberances.

Figure 8:
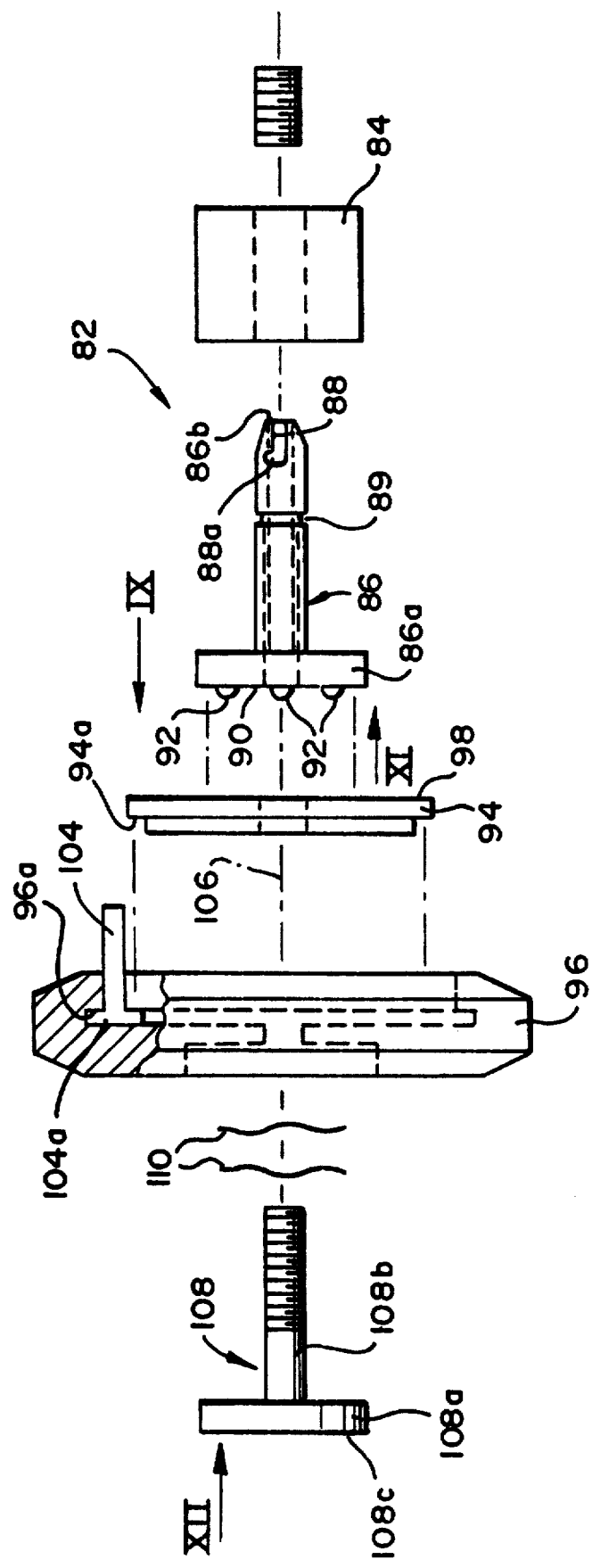
FIG. 8 is a top, exploded view of the tension mechanism according to the prevent invention.

A locking pin 104, whose functions will be more completely described hereinafter, is attached between the control knob 96 and the clutch plate 94. As can be seen in FIG. 8, locking pin 104 has an enlarged portion 104a which is slidably contacted by lip 96a of control knob 96 as well as lip 94a defined by the clutch plate 94. The engagement between these members is such that rotation of the control knob 96 and, consequently, the clutch plate 94 about axis 106 will not cause rotation of the locking pin 104 about the axis, but any axial movement of the control knob 96 along its rotational axis 106 will cause pin 104 to also move axially in this direction.

Tension adjusting screw 108 has a headed portion 108a and a threaded shank portion 108b which extends through the control knob 96, the clutch plate 94 and is threadingly engaged with the central opening defined by tension member 86. One or more wave spring washers 110 may be operatively interposed between the headed portion 108a of the tension adjusting screw 108 and the control knob 96. The face 108c of the tension screw 108 defines a slot 108d to facilitate rotation of the tension adjusting screw by a screwdriver or the like.

Set screw 109 may be threaded into the opposite end of the central opening in the tension member 86 so as to bear against an end of shank 108b of tension adjusting screw 108. This locks tension adjusting screw 108 in its desired location and prevents inadvertent rotation of the tension adjusting screw.

The tension mechanism works as follows. After the end of safety cable 20 has been inserted into slot 88 and enlarged end portion 88a, the control knob 96 is manually rotated about axis 106. Due to the presence of one-way rotation mechanism 84, tension member 86 and, consequently, the control knob 96 will rotate only in one direction. The biasing force of wave spring washers 110 urges the control knob 96 as well as the clutch plate 94 towards the tension member 86 along axis 106 such that the protrusions 92 drivingly engage the indentations 100. Thus, rotation of control knob causes rotation of the tension member 86 through the clutch plate 94.

Such rotation causes a safety cable 20 inserted through a ferrule while restrained against longitudinal movement to be wound upon the end 86b of the tension member 86, such winding motion increasing the tension within the safety cable 20. Once this tension reaches a predetermined level, the rotative force exerted on the tension member 86 by the engagement of the protrusions 92 with the indentations 100 becomes less than the restrictive force exerted on the tension member 86 by the safety cable 20. This prevents tension member 86 from rotating and causes the protrusions 92 to slide along inclined ramp surfaces 102 as control knob 96 is rotated. This causes axial movement of the control knob 96 along axis 106 in a direction away from the tension member 86. Once the protrusions 92 are out of engagement with the indentations 100, no further rotation of tension member 86 can take place through the control knob 96. Rotation of the tension member 86 in the opposite direction is prevented by one-way rotation mechanism 84.

The level of tension at which the protrusions 92 slide along the inclined ramp surfaces 102 may be adjusted by rotating the tension adjusting screw 108. Rotation in one direction will increase the biasing force toward the right (as shown in FIG. 8) on the control knob 96 urging it toward tension member 86 and thereby applying a greater tension to the safety cable 20 before the disengagement of the protrusions 92 from the indentations 100. Similarly, rotation of the tension adjusting screw 108 in the opposite direction will lessen the tension applied to the safety cable 20 before such disengagement takes place.

Once the proper tension has been applied to the safety cable 20, the ferrule 24a may be crimped onto the safety cable. This is achieved by manually urging handle members 26 and 28 towards each other. As illustrated in FIG. 4, such movement of the handle members 26 and 28 will cause pivot pins 34 and 42 to move around the axis of pivot pin 30. Such movement causes relative movement between the nose portion 46 and the crimping punch driver 50 which is attached to the pivot pin 30. As best seen in FIG. 7, moving the handles 26 and 28 towards each other will cause drive 50 to move toward the left with respect to nose portion 46. The extending motion of the crimp punch 50b, along with the generally triangular configuration of opening 48 deforms the ferrule 24a so as to be crimped and permanently attached to safety cable 20. Moreover, the relative movement between the elongated body 46 and the ferrule 24a causes a shearing action on the safety cable 20 between the inner edge of aperture 70 and the adjacent lower edge of the ferrule 24a. The edges are moving in opposite relative directions so as to exert a shear action on the safety cable 24, which shear action severs the free end of the cable as the ferrule 24a is being crimped.

Figure 13:
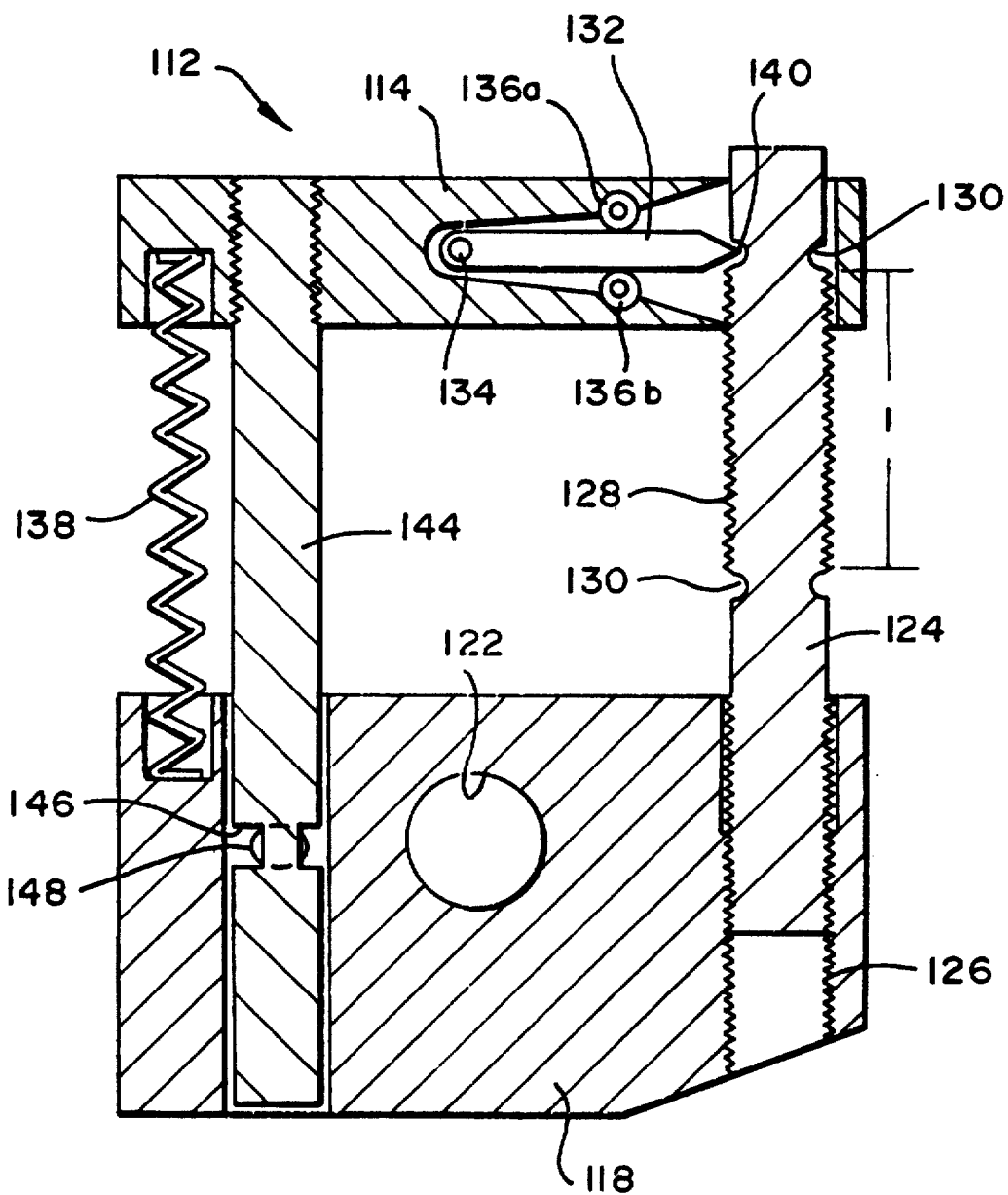
FIG. 13 is a cross-sectional view of the ratchet mechanism utilized in the present invention.

In order to prevent the movement of handle members 26 and 28 away from each other before the ferrule 24a has been permanently attached to the safety cable 20, ratchet mechanism 112 is provided. As best seen in FIGS. 4 and 13 ratchet mechanism 112 comprises a ratchet body 114 attached to handle member 26 via pivot pin 116. It also comprises a support body 118 attached to handle member 28 via pivot pin 120. Support body 118 defines a laterally extending opening 122 in which is mounted the one-way rotation mechanism 84 of the tensioning device. Ratchet member 124 is attached to the support body 118 via threads 126. Ratchet member 124 also extends through the ratchet body 114 and defines a plurality of ratchet teeth 128 extending over a length 1 of the ratchet member 124. Ratchet member 124 also defines ratchet grooves 130 located at either end of the ratchet teeth 128. The depth of ratchet teeth 130 is greater than that of ratchet teeth 128 as illustrated in FIG. 13.

Pawl 132 is pivotally attached ratchet body 114 via pivot pin 134. Resilient biasing members 136a and 136b are located on opposite sides of pawl 132 and exert a biasing force thereon urging it to the central position illustrated in FIG. 13. Compression spring 138 is operatively interposed between the ratchet body 114 and support body 118 so as to normally urge these elements apart.

Figure 14A:
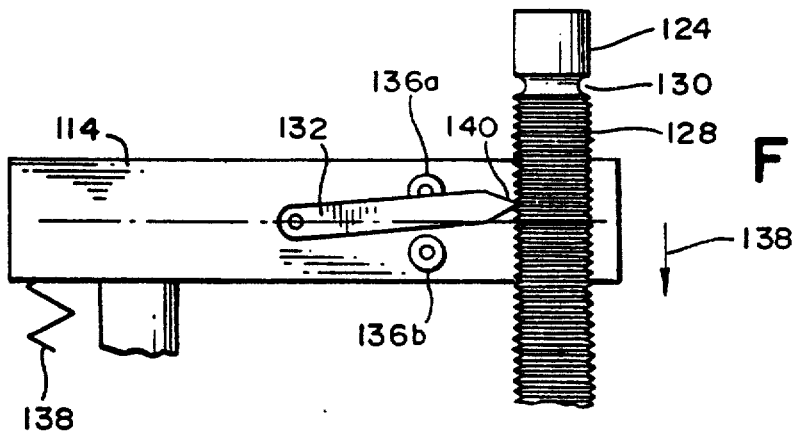
FIGS. 14A-14C are schematic illustrations of the sequential movement of the ratchet mechanism illustrating the positions of the ratchet pawl.
Figure 14B:
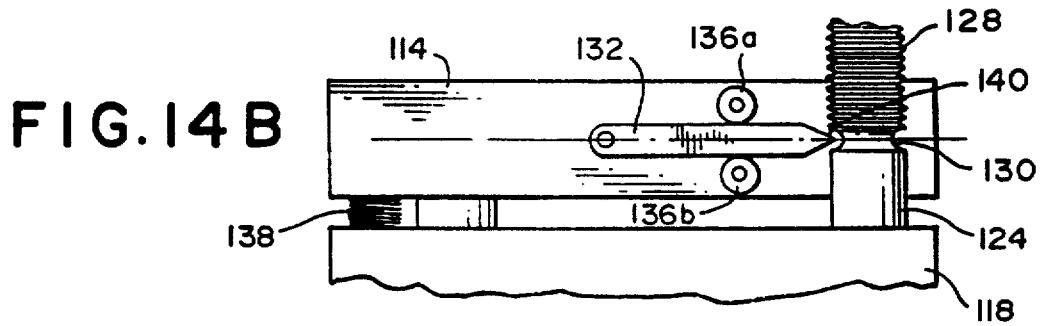
Figure 14C:
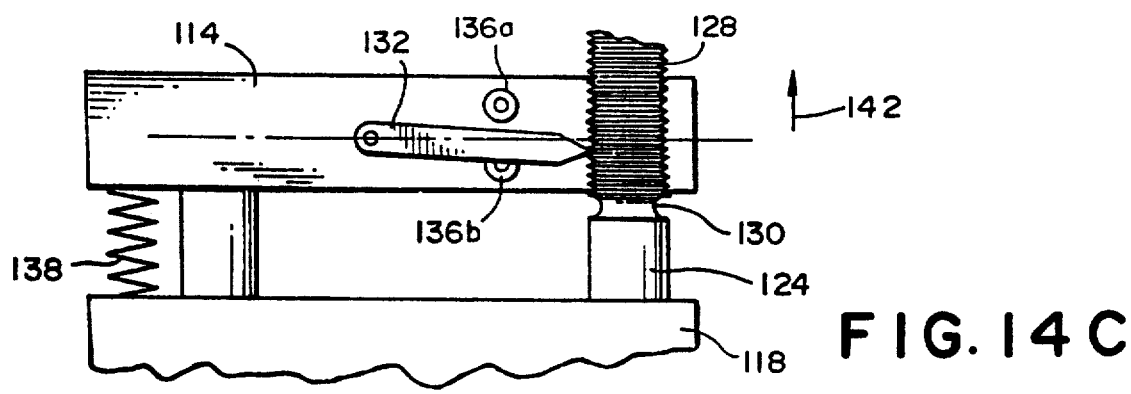

The operation of the ratchet mechanism can be seen from FIGS. 14A-14C. Movement of handle members 26 and 28 towards each other will cause ratchet body 114 and support body 118 to also move towards each other. Thus, ratchet body 114 moves in the direction of arrow 138 in FIG. 14A relative to ratchet member 124a. Pawl 132 defines an engagement edge 140 which, when the ratchet body 114 is displaced towards support body 118, engages ratchet teeth 128. The movement of ratchet body 114 will cause pawl 132 to pivot about pivot pin 134 so as to compress resilient biasing member 136a. This compression will increase the force urging the pawl 132 toward its central position illustrated in FIG. 13. However, the depth of the ratchet teeth 128 is insufficient to allow the pawl 132 to return to this position.

Thus, once the engagement edge 140 engages ratchet teeth 128, it is impossible for ratchet body 114 to move in any direction other than that indicated by arrow 138 in FIG. 14a. This prevents the handles 26 and 28 from being moved apart as long as pawl 132 is engaged with ratchet teeth 138 to prevent partial crimping of a ferrule.

Once the handles 26 and 28 have been moved towards each other sufficiently for the crimping punch 50 to have fully crimped the ferrule 24a onto the safety wire 20, the ratchet body 14 and the support body 118 will be in the positions illustrated in FIG. 14B. In this position, engagement edge 140 of pawl 132 enters the lower ratchet groove 130 which has a depth sufficient to allow the pawl 132 to be returned to its central position due to the biasing force of resilient biasing member 136a.

Once the engagement edge 140 enters the groove or ratchet tooth 130, ratchet 114 and support body 118 may move away from each other, as illustrated in FIG. 14C. Movement of ratchet body 114 relative to support body 118 in the direction of arrow 142 will bring engagement edge 140 once again into contact with ratchet teeth 128. The depth of the ratchet teeth 128 will cause the pawl 132 to pivot about pivot pin 134 and compress resilient biasing member 136b. This depth, however, is insufficient to allow the pawl 132 to return to its center position. This prevents movement of ratchet body 114 in any direction except that indicated by arrow 142. Once ratchet body 114 reaches the position illustrated in FIG. 13, the upper ratchet groove 130 will enable the pawl 132 to be returned to its center position by resilient biasing members 136a and 136b.

The invention also includes a locking device for positively preventing the movement of handles 26 and 28 towards each other until the predetermined tension has been established in safety cable 20. This is achieved by locking member 144 which may be threaded onto ratchet body 114 and slidably extend through support body 118. Locking member 144 defines a circumferential locking recess 146 which, when the handles 26 and 28 are in their fully opened position and ratchet body 114 is in the position illustrated in FIG. 13 (wherein the engagement edge 140 is located in ratchet groove 130) the locking recess 146 is in alignment with transverse opening 148 defined by support member 118. When the tension mechanism 82 is assembled and one-way rotation mechanism 84 is mounted in opening 122 through the support body 118, locking pin 104 attached to the control knob 96 extends into opening 148. The length of locking pin 104 is such that, as long as the control knob 96 is in driving engagement with the tension member 86 (indentations 100 are in driving engagement with protrusions 92), pin 104 extends through the opening 148 and into the locking recess 146. This prevents any movement of locking member 144 along its longitudinal axis, thereby preventing handles 26 and 28 from being moved toward each other.

As previously noted, once the proper tension in cable is achieved, the action of protrusions 92 moving along the inclined ramp surfaces 102 will cause control knob 96 and clutch plate 94 to move axially along the rotational axis 106. This axial movement withdraws pin 104 from engagement with the locking recess 146, thereby enabling the ratchet body and support body to be moved towards each other along with handle members 26 and 28.

Figure 15:
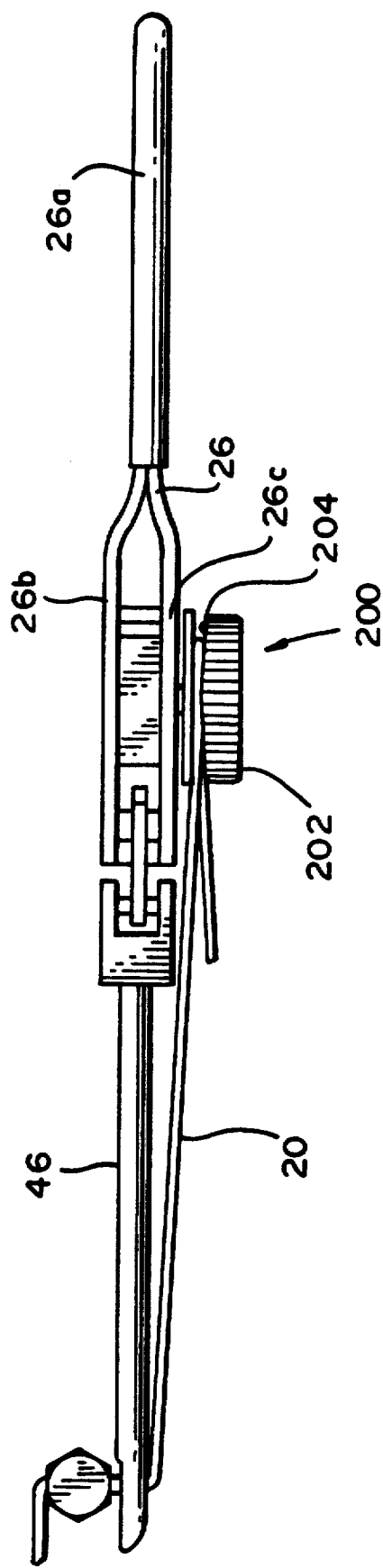
FIG. 15 shows an alternate embodiment of the invention showing a different tension mechanism.
Figure 17:
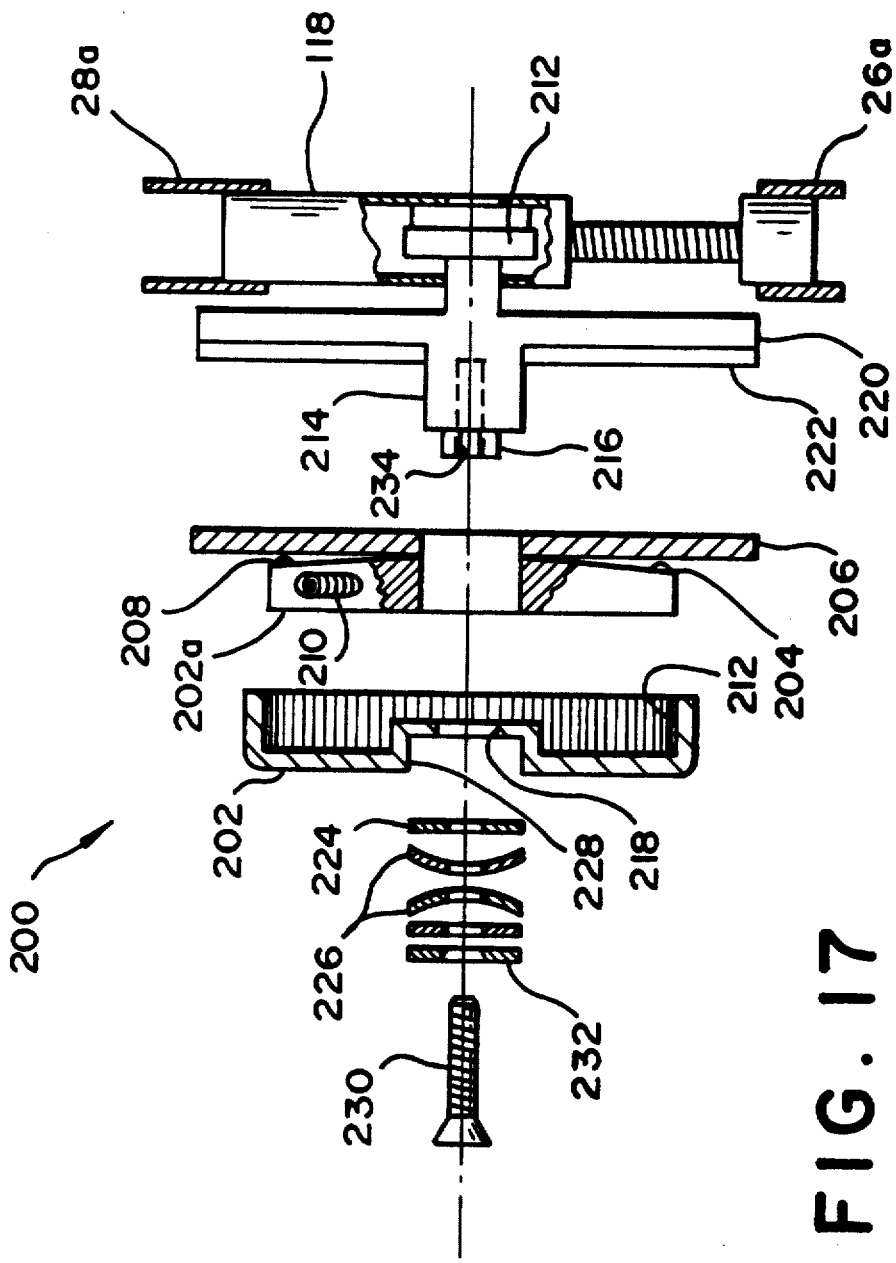
FIG. 17 shows an exploded view of the tension mechanism shown in FIG. 15.

An alternate embodiment of the tensioning device is shown in FIGS. 15 and 17, where similar elements of the tool illustrated in FIGS. 1-14(c) are identified by corresponding reference numerals. In this embodiment, the tensioning device 200 includes a manual rotary knob 202 about which safety cable 20 is wrapped by the operator of the tool until a section of the cable lies within a tapered groove 204 and is frictionally engaged between the knob 202 and a back plate 206 (see FIG. 17). Spring-biased ball elements 208 retain the free end of safety cable 20 between the knob 202 and plate 206 during preliminary rotation of the knob 202. Upon continued rotation of knob 202, cable 20 is securely engaged between the underside of knob 202 and plate 206 in groove 204 so that it is progressively wrapped about the axis of rotation of knob 202 to thereby tension the safety cable 20 in the direction of the tool handles 26(a), 28(a).

As shown in FIG. 17, knob 202 actually comprises an assembly of an outer knob element 202 and an inner knob 202(a) that is connected to the outer knob element 202 through a spring clutch detent 210 that cooperates with serrations 212 within the inner peripheral surface of knob element 202. Thus, knob 202 drives inner knob element 202(a) through the spring detent 210 until tension in safety cable 20 lodged in the tapered groove 204 creates sufficient resistance to overcome the spring clutch detent 210, whereupon continued rotation of knob 202 will cause the serrations 212 to slip over the spring 210 and effectively disconnect the knob 202 from continued driving relationship with inner knob element 202(a) so that such knob rotation does not increase tension in the cable 20.

Reverse rotation of knob 202 is prevented at all times by means of a one-way clutch 212 within support body 118 which is coupled to the knob 202 by means of shaft 214 which includes a square drive pin 216 coupled to square drive opening 218 in knob 202. Shaft 214 may be round so that inner knob 202(a) and plate 206 freely rotate about the shaft 214. Knob 202, however, due to the coupling relationship between the square drive 216 and the square opening 218, is positively coupled for rotation to shaft 214. One-way clutch 212 may be of any known variety and is arranged to both support the shaft 214 and to permit shaft 214 to rotate only in a single direction.

Shaft 214 is illustrated as coupled to a support plate 220 which may include a friction surface 222 against which the underside of backplate 206 rests when the tension device is fully assembled.

Assembly of the tension device involves sliding plate 206 and inner knob 202(a) over shaft 214 so that the underside of plate 206 rests against friction surface 222. Knob 202 is then slipped over the square drive 216 and then flat and spring washers 224, 226 are placed within recess 228 in knob 202. Threaded retainer screw 230 and cover plate 232 are then placed over the washers 224, 226, with screw 230 engaging the threads in opening 234 in shaft 214.

Operation of the tensioning mechanism 200 merely involves wrapping a free end of safety cable 20 over the knob 202 so that the wire is engaged in the tapered groove 204, with the free end sliding past one of the spring biased ball elements 208. A plurality of spring biased ball elements 208 may be spaced circumferentially around the inner knob 202(a) to provide ready access for securing a free end of a safety cable during each tensioning operation. Rotation of knob 202 in a cable winding direction is then carried out until knob 202 begins to slip relative to inner knob 202(a) whereupon the handles may be actuated to crimp ferrule 22(a) on safety cable 20, as previously described.

In accordance with this embodiment of the invention, the handles 26(a), 28(a) may be activated to cause crimping of ferrules 24(a) independently of the degree of tension in safety cable 20. More specifically, in accordance with the embodiment of FIGS. 15 and 17, locking pin 14 illustrated in FIG. 8 and locking member 144 illustrated in FIG. 13 are omitted.

Figure 16:
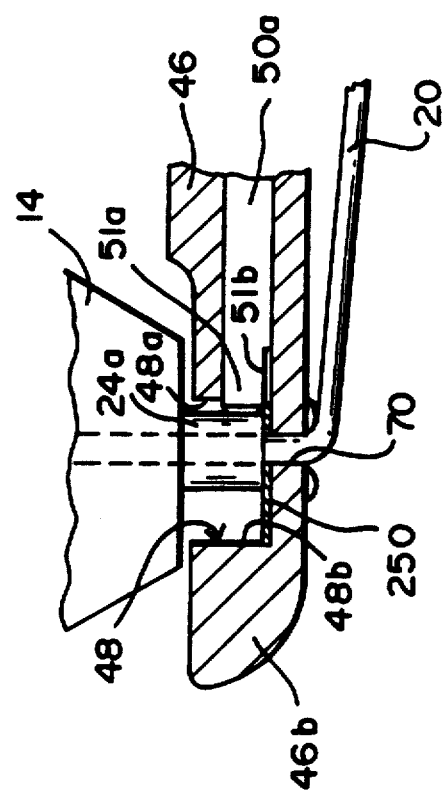
FIG. 16 shows an alternate embodiment of the ferrule crimping and safety cable cutting portion of the tool according to the invention.

An alternate embodiment of the ferrule crimping portion of the tool is illustrated in FIG. 16. In accordance with this embodiment, a replaceable cutting plate 250 preferably made of hardened metal such as tool steel is provided at the bottom of opening 48 to improve the wear characteristics of the crimping and cutting portion of the tool. The plate 250 provides a sharpened edge against which the cable 20 is urged by ferrule 24(a) during crimping to thereby cause shearing of the cable 20 adjacent the lower surface of the ferrule 24(a). The plate 250 may be constructed so as to be replaceable to increase the service life of the tool.

In accordance with the embodiment of FIG. 16, the crimping punch 51a includes a flattened bottom section 51b that slides over plate 250 when the punch is extended towards it full crimping position towards the distal wall 48b of opening 48 to assist in the shearing action used to cut the free end of cable 20 away from the ferrule during crimping. The crimping punch 51a, of course, is also located so as to be closely adjacent the bottom of opening 48 next to cutting plate 250 to maximize the shearing force used for cutting the free end of cable 20 away from the remainder of the cable.

To ensure that the ferrule 24(a) is disposed contiguous with the cutting plate 250 during crimping, the depth of opening 48 is selected such that the length of a ferrule 24(a) to be crimped by the tool is always slightly longer than the depth of the opening 48 to ensure that the ferrule, which is disposed between fastener 14 and plate 250 is pressed against the plate 250 when the distal end portion 46b of the body member 46 is brought up against the fastener 14 in preparation for crimping of the ferrule and cutting of the cable.

It is be to be noted that opening 48 is generally triangular and elongate as shown in FIG. 4, whereby a ferrule disposed in the opening is lodged at the wider end of the opening and gently rests against the two sides of the narrow end of the opening before crimping. Crimping forces the ferrule to be wedged against the narrow end of the opening 48 by the punch 50b with sufficient relative movement as described above to cause shearing of cable 20.

The foregoing description is provided for illustrative purposes only and should not be construed as in any way limiting this invention, the scope of which is defined solely by the appended claims.

We claim:

1. Apparatus for crimping a motion stop ferrule to a wire type safety cable extending through the bore of the ferrule while under tension and for cutting the free end of the cable from the ferrule upon crimping comprising:

a tool body having at least one handle element connected thereto for manual manipulation;

an elongate nose portion extending forwardly of the tool body and having a distal end and a proximal end, said proximal end connected to the tool body;

a ferrule crimping punch driving element extending axially along the nose portion and operatively connected to the handle element for reciprocating motion upon manipulation of the handle element;

said distal end of said nose portion including a ferrule receiving opening extending partially therethrough and transversely of the nose portion distal end;

a crimping punch disposed at the distal end area of said nose portion, operatively connected to the punch driving element for reciprocal movement axially along the nose portion, and extending axially into said opening upon outward reciprocal movement to a sufficient extent to cause crimping of a ferrule located in said opening;

a safety cable tension device operatively associated with the tool body and arranged to be engageable by a safety cable extending from the distal end of said nose portion to apply tension force to such cable upon actuation thereof;

said ferrule receiving opening being elongate in the axial direction of said nose portion and having a length greater than the diameter of a ferrule to be crimped by the tool, said opening including a transversely extending side wall, said crimping punch cooperating with said sidewall during crimping of a ferrule disposed in said opening;

a safety cable receiving aperture having at least one dimension extending transversely across the aperture that is smaller than the diameter of a ferrule to be crimped by the tool, said aperture extending transversely of said nose portion in the same direction as said ferrule receiving opening and intersecting the bottom of said ferrule receiving opening where the safety cable receiving bore of a ferrule is disposed before crimping, whereby, upon extension of the ferrule punch and with a ferrule disposed in the ferrule receiving opening so that its bore is aligned with the cable receiving aperture and its one end resting against the bottom of the opening with a safety cable extending therethrough, a ferrule will be driven axially relative to the cable receiving aperture into engagement with a wall of the ferrule receiving opening to be thereby crimped, said axial movement also causing a safety cable extending through the ferrule bore and cable receiving aperture to be sheared between the end of the ferrule located against the bottom wall of the opening and the bottom wall of the opening.

2. Apparatus as claimed in claim 1, wherein the bottom wall of said opening comprises a hardened cutter element adjacent said cable receiving aperture, said cutter element including a cutter edge adjacent said cable receiving aperture and adapted to engage and shear a cable when a ferrule through which the cable extends is axially displaced by the punch during crimping.

3. Apparatus as claimed in claim 2, wherein said cutter is removably connected to the nose portion of the tool.

4. Apparatus as claimed in claim 3 or 4, wherein said punch includes a flat lower surface extendible over and contiguous with said cutter edge when said punch extends towards a full crimping position; said punch, when extended to its full crimping position, overlying said cable receiving aperture, whereby said lower surface assists shearing of a cable extending adjacent said cutter edge.

5. Apparatus as claimed in claim 4, wherein said lower flat surface of said punch is arranged to normally retain said cutter in said ferrule receiving opening.

6. Apparatus as claimed in claim 1 or 2, wherein the depth of said ferrule receiving opening is selected so that it is less than the total height of a ferrule to be crimped.

7. Apparatus for crimping a motion stop ferrule to a wire type safety cable extending through the bore of the ferrule while under tension comprising:

a tool body having at least one handle element connected thereto for manual manipulation;

an elongate nose portion extending forwardly of the tool body and having a distal end and a proximal end, said proximal end connected to the tool body;

a ferrule crimping punch driving element extending axially along the nose portion and operatively connected to the handle element for reciprocating motion upon manipulation of the handle element;

said distal end of said nose portion including a ferrule receiving opening extending partially therethrough and transversely of the nose portion distal end;

a crimping punch disposed at the distal end area of said nose portion, operatively connected to the punch driving element for reciprocal movement axially along the nose portion, and extending axially into said opening upon outward reciprocal movement to a sufficient extent to cause crimping of a ferrule located in said opening;

a safety cable tension device operatively associated with the tool body and arranged to be engageable by a safety cable extending from the distal end of said nose portion to apply tension force to such cable upon actuation thereof;

said safety cable tension device comprising a rotary knob operatively associated with the tool body and connected to a tapered cable friction gripper by a detent clutch mechanism arranged to disconnect the knob from the tapered cable friction gripper when tension in a cable gripped by the friction gripper exceeds a threshold limit, and means for preventing rotation of the knob in a cable unwinding direction.

8. Apparatus as claimed in claim 7, including at least one cable engaging detent for releasable engaging a free end of a cable inserted in the friction gripper to cause the free end to be carried and wound about the gripper upon rotation of the knob in a winding direction.

9. Apparatus as claimed in claims 7 or 8, including a partial crimping preventing device associated with said handle element and arranged to prevent retraction of the ferrule crimping punch driving element away from the ferrule receiving opening once the driving element has been actuated by the handle element towards and extended position until the crimping punch has been extended to a full crimping position.

10. Apparatus for crimping a motion stop ferrule to a wire type safety cable extending through the bore of the ferrule while under tension and for cutting the free end of the cable from the ferrule upon crimping comprising:

a tool body having at least one handle element connected thereto for manual manipulation;

an elongate nose portion extending forwardly of the tool body and having a distal end and a proximal end, said proximal end connected to the tool body;

a ferrule crimping punch driving element extending axially along the nose portion and operatively connected to the handle element for reciprocating motion upon manipulation of the handle element;

said distal end of said nose portion including a ferrule receiving opening extending partially therethrough and transversely of the nose portion distal end;

a crimping punch disposed at the distal end area of said nose portion, operatively connected to the punch driving element for reciprocal movement axially along the nose portion, and including a distal end extending axially into said opening upon outward reciprocal movement to a sufficient extent to cause crimping of a ferrule located in said opening;

a safety cable tension device operatively associated with the tool body and arranged to be engageable by a safety cable extending from the distal end of said nose portion to apply tension force to such cable upon actuation thereof;

said ferrule receiving opening being elongate in the axial direction of said nose portion and having a length greater than the diameter of a ferrule to be crimped by the tool, said opening having a proximal end disposed toward the crimping punch and a longitudinally opposed distal end; said opening including a transversely extending sidewall at said opening distal end, said crimping punch cooperating with said sidewall during crimping of a ferrule disposed in said opening;

a safety cable receiving aperture having at least one dimension extending transversely across the aperture that is smaller than the diameter of a ferrule to be crimped by the tool, said aperture extending transversely of said nose portion in the same direction as said ferrule receiving opening and intersecting the bottom of said ferrule receiving opening where the safety cable receiving bore of a ferrule is disposed before crimping, said aperture being located closer to said distal end of said crimping punch then said distal end of said ferrule receiving opening when the punch distal end is disposed at a position adjacent a ferrule located in said ferrule receiving opening so that, upon extension of the crimping punch and with a ferrule disposed in the ferrule receiving opening so that its bore is aligned with the cable receiving aperture and its one end is resting against the bottom of the opening with a safety cable extending through the bore, a ferrule will be driven axially relative to the cable receiving aperture against said transversely extending sidewall to be thereby crimped, and said axial movement will cause a safety cable extending through the ferrule bore and cable receiving aperture to be sheared between the end of the ferrule located against the bottom wall of the opening and the bottom wall of the opening.

11. Apparatus for crimping a motion stop ferrule to a wire type safety cable extending through the bore of the ferrule while under tension and for cutting the free end of the cable from the ferrule upon crimping comprising:

a tool body having at least one handle element connected thereto for manual manipulation;

an elongate nose portion extending forwardly of the tool body and having a distal end and a proximal end, said proximal end connected to the tool body;

a ferrule crimping punch driving element extending axially along the nose portion and operatively connected to the handle element for reciprocating motion upon manipulation of the handle element;

said distal end of said nose portion including a ferrule receiving opening extending partially therethrough and transversely of the nose portion distal end;

a crimping punch disposed at the distal end area of said nose portion, operatively connected to the punch driving element for reciprocal movement axially along the nose portion, and including a distal end extending axially into said opening upon outward reciprocal movement to a sufficient extent to cause crimping of a ferrule located in said opening;

a safety cable tension device operatively associated with the tool body and arranged to be engageable by a safety cable extending from the distal end of said nose portion to apply tension force to such cable upon actuation thereof;

said ferrule receiving opening being elongate in the axial direction of said nose portion and having a length greater than the diameter of a ferrule to be crimped by the tool, said opening having a proximal end disposed toward the crimping punch and a longitudinally opposed distal end; said opening including a transversely extending sidewall at said opening distal end, said crimping punch cooperating with said sidewall during crimping of a ferrule disposed in said opening;

a safety cable receiving aperture having at least one dimension extending transversely across the aperture that is smaller than the diameter of a ferrule to be crimped by the tool, said aperture extending transversely of said nose portion in the same direction as said ferrule receiving opening and intersecting the bottom of said ferrule receiving opening where the safety cable receiving bore of a ferrule is disposed before crimping, said aperture being located closer to said crimping punch distal end when the punch distal end than said transversely extending sidewall is disposed at a position adjacent a ferrule located in said ferrule receiving opening so that, upon extension of the crimping punch and with a ferrule disposed in the ferrule receiving opening so that its bore is aligned with the cable receiving aperture and its one end is resting against the bottom of the opening with a safety cable extending therethrough, a ferrule will be driven axially relative to the cable receiving aperture against said transversely extending sidewall to be thereby crimped, and said axial movement will cause a safety cable extending through the ferrule bore and cable receiving aperture to be sheared between the end of the ferrule located against the bottom wall of the opening and the bottom wall of the opening.

12. Apparatus as claimed in claim 10 or 11, wherein the bottom wall of said opening comprises a hardened cutter element adjacent said cable receiving aperture, said cutter element including a cutter edge adjacent said cable receiving aperture and adapted to engage and shear a cable when a ferrule through which the cable extends is axially displaced by the punch during crimping.

13. Apparatus as claimed in claim 12, wherein said cutter is removably connected to the nose portion of the tool.

14. Apparatus as claimed in claim 12, wherein said punch includes a flat lower surface extendible over and contiguous with said cutter edge when said punch extends towards a full crimping position; said punch, when extended to its full crimping position, overlying said cable receiving aperture, whereby said lower surface assists shearing of a cable extending adjacent said cutter edge.

15. Apparatus as claimed in claim 14, wherein said lower flat surface of said punch is arranged to normally retain said cutter in said ferrule receiving opening.

16. Apparatus as claimed in claim 10 or 11, wherein the depth of said ferrule receiving opening is selected so that it is less than the total height of a ferrule to be crimped.

* * * * *

UNITED STATES PATENT AND TRADEMARK OFFICE
CERTIFICATE OF CORRECTION

PATENT NO. : 5,305,511
DATED : 26 April 1994
INVENTOR(S) : KOEHLER et al.

It is certified that error appears in the above-indentified patent and that said Letters Patent is hereby corrected as shown below:

Column 11, line 26, after "tool", insert --said opening having a proximal end disposed toward the crimping punch and a longitudinally opposed distal end;--;

Column 11, line 27, after "wall" insert --at said opening distal end--;

Column 11, line 38, delete "whereby" and insert --said aperture being located closer to said proximal end of said ferrule receiving opening than said distal end of the opening, so that, --;

Col. 11, lines 45-46, after "aperture", delete "into engagement with a wall of the ferrule receiving opening" and insert --against said ferrule receiving aperture sidewall--

Column 11, line 47, after "crimped," insert --and--; change "also causing" to --will cause--;

Column 11, line 64, change "3 or 4" to --2 or 3--;

Column 12, line 48, change "releasable" to --releasably--;

UNITED STATES PATENT AND TRADEMARK OFFICE
CERTIFICATE OF CORRECTION

PATENT NO. : 5,305,511
DATED : April 26, 1994
INVENTOR(S) : Koehler et al.

It is certified that error appears in the above-indentified patent and that said Letters Patent is hereby corrected as shown below:

Column 14, line 38, after "end", insert --than said tranversely extending sidewall--;

lines 39 - 40, after "end", delete "than said transversely extending sidewall".

Signed and Sealed this

Fourteenth Day of March, 1995

Attest:

BRUCE LEHMAN

Attesting Officer

Commissioner of Patents and Trademarks